United States Patent
Kinoshita

(10) Patent No.: US 8,536,974 B2
(45) Date of Patent: Sep. 17, 2013

(54) READ APPARATUS OF RF TAG AND METHOD OF CONTROLLING READ OF RF TAG

(75) Inventor: Satoshi Kinoshita, Tokyo (JP)

(73) Assignee: NEC Corporation, Tokyo (JP)

( * ) Notice: Subject to any disclaimer, the term of this patent is extended or adjusted under 35 U.S.C. 154(b) by 913 days.

(21) Appl. No.: 12/689,595

(22) Filed: Jan. 19, 2010

(65) Prior Publication Data

US 2010/0117786 A1    May 13, 2010

Related U.S. Application Data

(62) Division of application No. 11/728,371, filed on Mar. 26, 2007, now Pat. No. 7,615,420.

(30) Foreign Application Priority Data

Mar. 27, 2006    (JP) ................................. 2006-084523

(51) Int. Cl.
*H04B 1/20*    (2006.01)

(52) U.S. Cl.
USPC ..... 340/3.42; 340/3.44; 340/10.1; 340/572.1; 340/572.4; 340/572.7; 235/382; 235/383; 235/385; 235/492

(58) Field of Classification Search
USPC ................ 340/3.42, 3.44, 10.1, 572.1–572.4; 235/382, 383, 385, 492
See application file for complete search history.

(56) References Cited

U.S. PATENT DOCUMENTS 5,887,176 A * 3/1999 Griffith et al. ................ 713/320

FOREIGN PATENT DOCUMENTS

| CN | 101038621 A | 9/2007 |
| JP | 2001-134723 | 5/2001 |
| JP | 2002-312814 | 10/2002 |
| JP | 2005-157645 A | 6/2005 |
| JP | 2005-339089 A | 12/2005 |

OTHER PUBLICATIONS

Japanese Official Action dated May 14, 2010.
Chinese Official Action dated Jan. 15, 2010 with English translation.

* cited by examiner

*Primary Examiner* — Tai T Nguyen
(74) *Attorney, Agent, or Firm* — Scully, Scott, Murphy & Presser P.C.

(57) ABSTRACT

An RF tag system includes a first reader/writer unit and a second reader/writer unit. A first reader/writer control unit is configured to control the first reader/writer unit to read a first data from a first RF tag, and to detect a trouble state of the first reader/writer unit. A second reader/writer control unit is configured to control the second reader/writer unit to read a second data from a second RF tag, and to detect a trouble state of the second reader/writer unit. A monitoring section is configured to issue a selection instruction and to monitor the first reader/writer unit through the first reader/writer control unit, and the second reader/writer unit through the second reader/writer control unit. A switching section is configured to select one of the first reader/writer control unit and the second reader/writer control unit in response to the selection instruction from the monitoring section.

4 Claims, 4 Drawing Sheets

READ APPARATUS OF RF TAG AND METHOD OF CONTROLLING READ OF RF TAG

The present application is a divisional application of U.S. Ser. No. 11/728,371, filed Mar. 26, 2007, which issued as U.S. Pat. No. 7,615,420, and which claims the benefit of priority of Japanese Application No. 2006-084523 filed Mar. 27, 2006, the entire contents of which are incorporated by reference herein.

BACKGROUND OF THE INVENTION

1. Field of the Invention

The present invention relates to a read apparatus for an RF tag, and more particularly relates to a redundancy in a read apparatus for an RF tag and a controlling method for the same.

2. Description of the Related Art

An RF (Radio Frequency) tag reader/writer apparatus can perform a radio communication with an RF tag and read ID (Radio Frequency Identification) of the RF tag. As for a trouble of the RF tag reader/writer apparatus, it may be considered to use two or more RF tag reader/writer apparatuses and ensure its redundancy. However, if the two RF tag reader/writer apparatuses are installed separately from each other, there is a problem which of the RF tag reader/writer apparatuses is used when the ID of the RF tag is read. If they are installed close to each other, there is a possibility of interference of an electric wave.

In conjunction with the above description, Japanese Laid Open Patent Application (JP-P2005-157645A: first conventional example) discloses a read apparatus. In this conventional example, the read apparatus for a radio tag in which an identification code is recorded without any contact. This read apparatus includes a plurality of reader apparatuses to which a plurality of antennas are connected. A controller performs a control in which one antenna connected to each reader apparatus is turned on when a plurality of tags are located at a read region of the read apparatus. Thus, the adjacent antenna is not turned on, and the plurality of radio tags inside the read region are consequently read.

Also, Japanese Laid Open Patent Application (JP-P2005-339089A: second conventional example) discloses a non-contact ID system. This conventional non-contact ID system includes a plurality of answerers, a questioner and a host manager. The plurality of answerers store peculiar identifiers, and meet communication standard different from each other. The questioner contains a plurality of signal processing sections and a control section. The plurality of signal processing sections send a plurality of question signals are transferred to the answerers based on the respective communication standards. The signal processing section contains a plurality of signal processors, each of which receives the answering signal including the identifier replied by the answerer receiving the question signal of the communication rule agreeing with itself. When receiving the external question request, the controller outputs a drive command or stop command to its signal processor. The high order manager outputs the question request to send the question signal based on any of the communication rules to the answerer.

When sending the question signal based on any of the communication standards to the questioner, the host manager sends a question request corresponding to the communication rule. Then, the controller of the questioner outputs the drive command to the signal processor corresponding to the communication rule. On the other hand, the controller outputs the stop command to the signal processors corresponding to the communication rules except it. This non-contact ID system has such feature.

SUMMARY OF THE INVENTION

It is therefore an object of the present invention to provide an apparatus for reading an RF tag, which reserves a redundancy of an RF tag reader/writer apparatus while managing a plurality of RF tag reader/writer apparatuses arranged close to each other and avoiding theirs interference, and a method of controlling an RF tag reading.

In an aspect of the present invention, an RF tag system includes a first reader/writer unit; a second reader/writer unit; a first reader/writer control unit configured to control the first reader/writer unit to read a first data from a first RF tag, and to detect a trouble state of the first reader/writer unit; a second reader/writer control unit configured to control the second reader/writer unit to read a second data from a second RF tag, and to detect a trouble state of the second reader/writer unit; a monitoring section configured to issue a selection instruction and to monitor the first reader/writer unit through the first reader/writer control unit, and the second reader/writer unit through the second reader/writer control unit; and a switching section configured to select one of the first reader/writer control unit and the second reader/writer control unit in response to the selection instruction from the monitoring section.

Here, the monitoring section may issue the selection instruction to the switching section to select the second reader/writer control unit when the trouble state of the first RF tag reader/writer unit is confirmed.

Also, the monitoring section may issue a monitor instruction to the first reader/writer control unit to detect recovery of the first RF tag reader/writer unit from the trouble state, when the trouble state of the first RF tag reader/writer unit is confirmed.

Also, the RF tag system may further include a communication control section configured to communicate with an external network and to transfer a data request from the external network to the switching section to acquire a data of the first RF tag or second RF tag.

Also, the first RF tag and the second RF tag may be a same single reference RF tag provided for operation confirmation, and the first and second RF tag reader/writer units may access the reference RF tag.

In another aspect of the present invention, a method of controlling a read operation from an RF tag, is achieved by issuing an instruction to a switching section to use a first RF tag reader/writer control unit; by inquiring the first RF tag reader/writer control unit to check whether the first RF tag reader/writer unit is in a trouble state; by continuing to use first RF tag reader/writer control unit by the switching section if the first RF tag reader/writer unit is not in the trouble state; by issuing an instruction to the switching section to use a second RF tag reader/writer control unit, when it is confirmed that the first RF tag reader/writer unit is not in the trouble state; by inquiring first RF tag reader/writer control unit to confirm whether the first RF tag reader/writer unit has been recovered from the trouble state, when it is confirmed that the first RF tag reader/writer unit is not in the trouble state; and by issuing an instruction to the switching section to use the first RF tag reader/writer control unit, when it is confirmed that the first RF tag reader/writer unit has been recovered from the trouble state.

Also, the method may be achieved by further issuing a data read request from an application connected to an external network; receiving the data read request from the application and transferring the data read request to the switching section; and controlling one of the first RF tag reader/writer control unit and the second RF tag reader/writer control unit in response to the data read request to read a data from the RF tag.

Also, the method may be achieved by further issuing a read instruction to the first RF tag reader/writer control unit to read a data from the RF tag, when it is confirmed that the first RF tag reader/writer unit is not in the trouble state; and controlling the first RF tag reader/writer unit to access the RF tag to read the data by the first RF tag reader/writer control unit in response to the read instruction.

Also, the method may be achieved by further issuing a read instruction to the second RF tag reader/writer control unit to read a data from the RF tag, when it is confirmed that the first RF tag reader/writer unit is in the trouble state; and controlling the second RF tag reader/writer unit to access the RF tag to read the data by the second RF tag reader/writer control unit in response to the read instruction.

In still another aspect of the present invention, a method of controlling a read operation from an RF tag, is achieved by issuing a selection instruction to a switching section to select a first RF tag reader/writer control unit; by reading a data from a reference RF tag by a first RF tag reader/writer unit through the first RF tag reader/writer control unit; by continuing to select the first RF tag reader/writer control unit by the switching section if the data can be read out from the reference RF tag; by issuing the selection instruction to the switching section to select a second RF tag reader/writer control unit when the data cannot be read out from the reference RF tag; by monitoring whether the data can be read out from the reference RF tag by the first RF tag reader/writer unit, through the first RF tag reader/writer control unit in order to detect recovery of the first RF tag reader/writer unit from a trouble; by continuing to monitor the first RF tag reader/writer unit when the data cannot be read out from the reference RF tag by the first RF tag reader/writer unit; and by issuing the selection instruction to the switching section to select the first RF tag reader/writer control unit when the data can be read out from the reference RF tag.

Here, the method may be achieved by further discarding the data read out from the reference RF tag; neglecting a read/write instruction for the reference RF tag; and informing to an application, a list of identifiers of RF tags, from which the identifier of the reference RF tag is removed, in response to a read request of the identifiers of the RF tags from the application.

When the plurality of RF tag reader/writer units are provided close to each other, the redundancies of the RF tag reader/writer apparatuses can be reserved without any electric wave interference.

DESCRIPTION OF THE PREFERRED EMBODIMENTS

Hereinafter, an RF (radio frequency) tag system according to the present invention will be described in detail with reference to the attached drawings.

Figure 1:
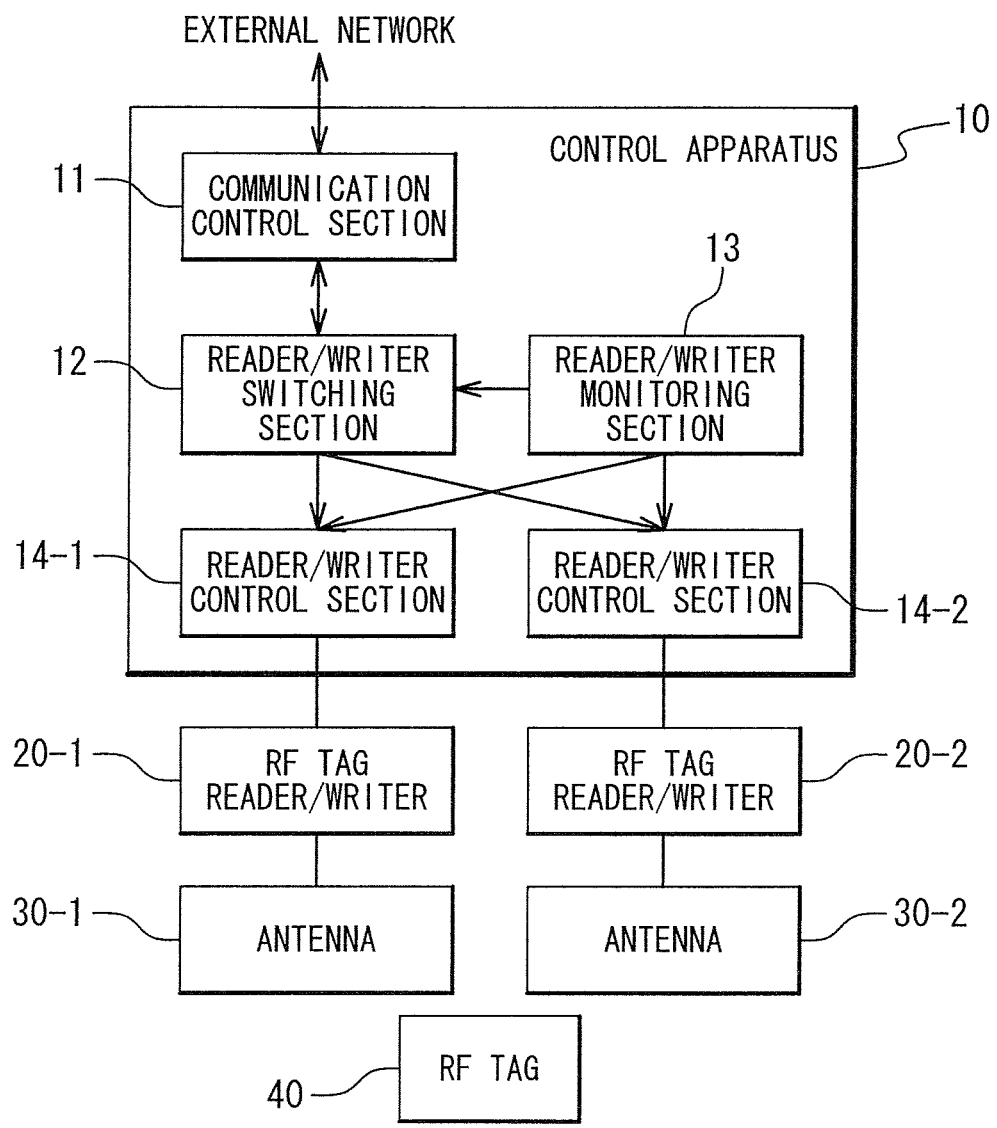
FIG. 1 is a block diagram showing a configuration of a first embodiment of the present invention.

FIG. 1 is a block diagram showing the configuration of an RF tag system according to the first embodiment of the present invention. As shown in FIG. 1, the RF tag system according to the first embodiment of the present invention contains a controller 10, RF tag reader/writer units 20 (20-1, 20-2), antennas 30 (30-1, 30-2) and an RF tag 40.

The controller 10 controls the RF tag reader/writer units 20. The RF tag reader/writer unit 20 (20-$i$, $i=1$ to n: n is the number of apparatuses) uses the antenna 30 and carries out a communication. Also, the RF tag reader/writer unit 20 uses the antenna 30 to read an identifier (ID) and a data from the RF tag 40 and starts or stops an RF output. Here, as an example, the RF tag reader/writer unit 20-1 and the RF tag reader/writer unit 20-2 are used. The antenna 30 (30-$i$, $i=1$ to n) sends and receives an electric wave to and from the RF tag 40. Also, when the RF tag 40 is placed at a predetermined position, its position and orientation are adjusted and installed to be able to communicate with any antenna. Also, the antenna 30-1 and the antenna 30-2 are used. The RF tag 40 holds a data containing an ID. At this time, the controller 10 contains a communication control section 11, a reader/writer apparatus switching section 12, a reader/writer monitoring section 13 and a reader/writer control sections 14 (14-1, 14-2).

The communication control section 11 performs communication with an external network and accesses to the RF tag 40 through the reader/writer switching section 12 in accordance with an request or instruction from an application in the network and the like. The reader/writer switching section 12 selects the RF tag reader/writer control section 14 to be used in accordance with a selection instruction from the reader/writer monitoring section 13. That is, the reader/writer control section 14 to be used is switched. The reader/writer monitoring section 13 periodically monitors a trouble in the RF tag reader/writer units 20 through the reader/writer control sections 14. The reader/writer control sections 14 (14-$i$, $i=1$ to n) instruct the RF tag reader/writer units 20 to read the ID of the RF tag 40 close thereto, to read and write a data from and to a memory inside the RF tag 40, to detect a trouble state and to start or stop the RF output. Here, as an example, the reader/writer apparatus control section 14-1 and the reader/writer apparatus control section 14-2 are used.

Figure 2:
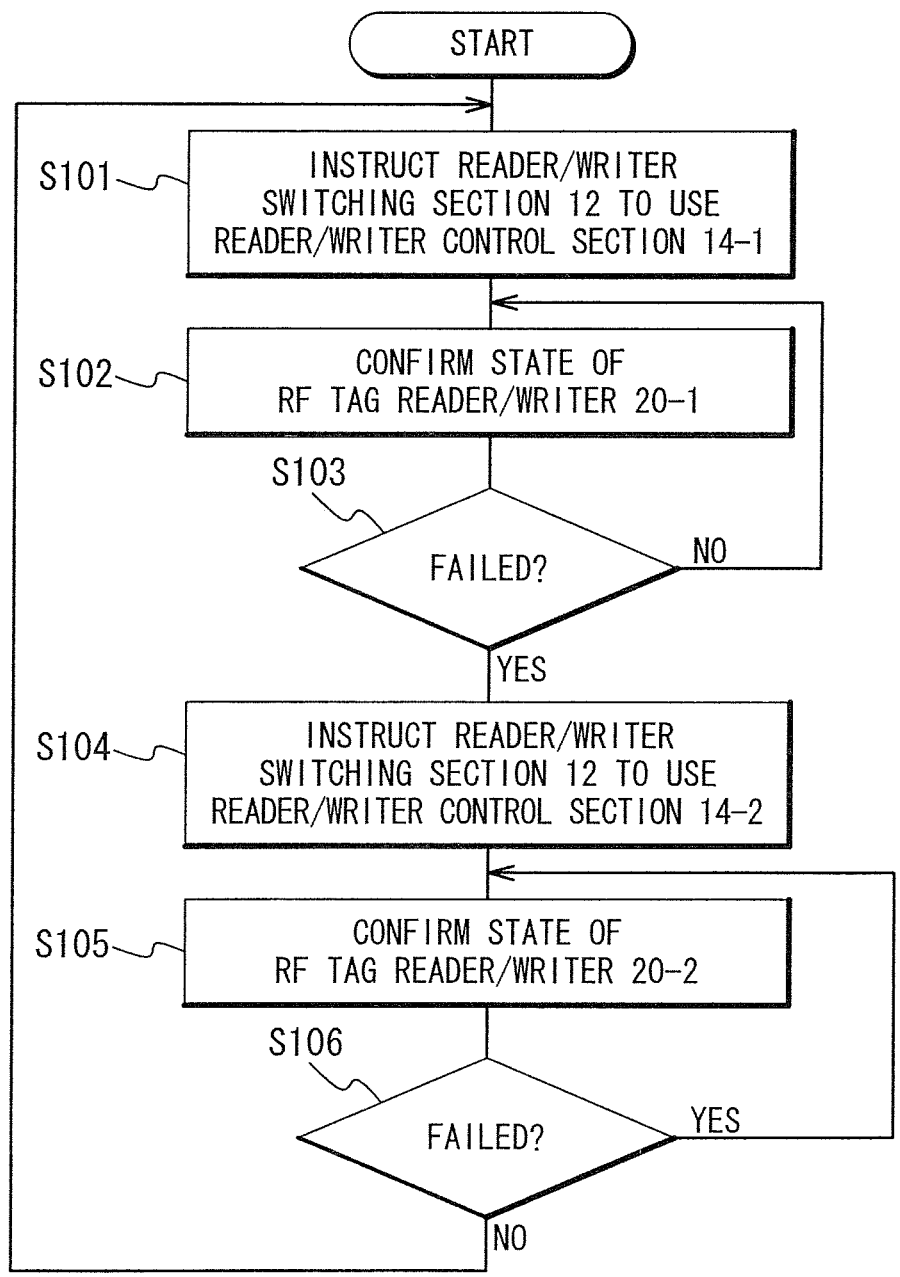
FIG. 2 is a flowchart showing operations of the first embodiment of the present invention.

The operation of the RF tag system in this embodiment will be described below in detail with reference to FIG. 1. The process of the reader/writer monitoring section 13 will be described below with reference to FIG. 2.

(1) Step S101

At first, the reader/writer monitoring section 13 issues a selection instruction to the reader/writer switching section 12 to select the reader/writer control section 14-1.

(2) Step S102

Next, the reader/writer monitoring section 13 issues a read instruction directly or through switching section 12 to the reader/writer control section 14-1 to check whether or not the RF tag reader/writer unit 20-1 is in a trouble state.

(3) Step S103

If the RF tag reader/writer unit 20-1 is not in the trouble state, the reader/writer switching section 12 may continue to select the reader/writer control section 14-1, and the operational flow returns to the step S102 in its original state.

(4) Step S104

If the RF tag reader/writer unit 20-1 is checked to be in the trouble state, the RF tag reader/writer unit 20-1 cannot be used. In this case, the reader/writer monitoring section 13 issues the selection instruction to the reader/writer switching section 12 to select the reader/writer control section 14-2 in order to use the RF tag reader/writer unit 20-2.

(5) Step S105

Next, in order to monitor the recovery of the RF tag reader/writer unit 20-1 from the trouble, the reader/writer monitoring section 13 issues a monitor instruction to the reader/writer control section 14-1 to check whether or not the RF tag reader/writer unit 20-1 is still in the trouble state. The monitor instruction may be periodically performed or the check may be periodically performed. Or, this check is performed when the use of the RF tag reader/writer unit 20-2 has been completed.

(6) Step S106

If the RF tag reader/writer unit 20-1 is troubled, the operational flow returns to the step S105 in its original state. If the RF tag reader/writer unit 20-1 is checked to be recovered from the trouble, the RF tag reader/writer unit 20-1 can be used. Thus, the operational flow returns to the step S101, in order to instruct the reader/writer switching section 12 to use the reader/writer control section 14-1.

It is assumed that an application connected to the external network issues a read request of a tag ID of a reader/writer apparatus. This request is received by the communication control section 11, and the read request is issued to the reader/writer switching section 12. The reader/writer switching section 12 transfers the read request to any of the reader/writer control section 14-1 and the reader/writer control section 14-2 in accordance with an instruction of the reader/writer monitoring section 13.

If the RF tag reader/writer unit 20-1 is not troubled, the reader/writer switching section 12 transfers the request to the reader/writer control section 14-1. As a result, the reader/writer control section 14-1 issues the read request to the RF tag reader/writer unit 20-1, and the RF tag reader/writer unit 20-1 uses the antenna 30-1 to read the data from the RF tag 40.

If the RF tag reader/writer unit 20-1 is troubled, the reader/writer switching section 12 transfers the read request to the reader/writer control section 14-2. As a result, the reader/writer control section 14-2 issues the read request to the RF tag reader/writer unit 20-2, and the RF tag reader/write unit 20-2 uses the antenna 30-2 to read the data of the RF tag 40.

In the RF tag system according to the embodiment of the present invention, a case that the number of the RF tag reader/writer apparatuses is 2 has been described. However, the number of the RF tag reader/writer apparatuses is not limited.

A case that the application which actually processes the RF tag data exists in the external network has been described. However, there is also a case that the application exists in the same apparatus as the controller 10 or it is connected by using a different method.

Second Embodiment

Figure 3:
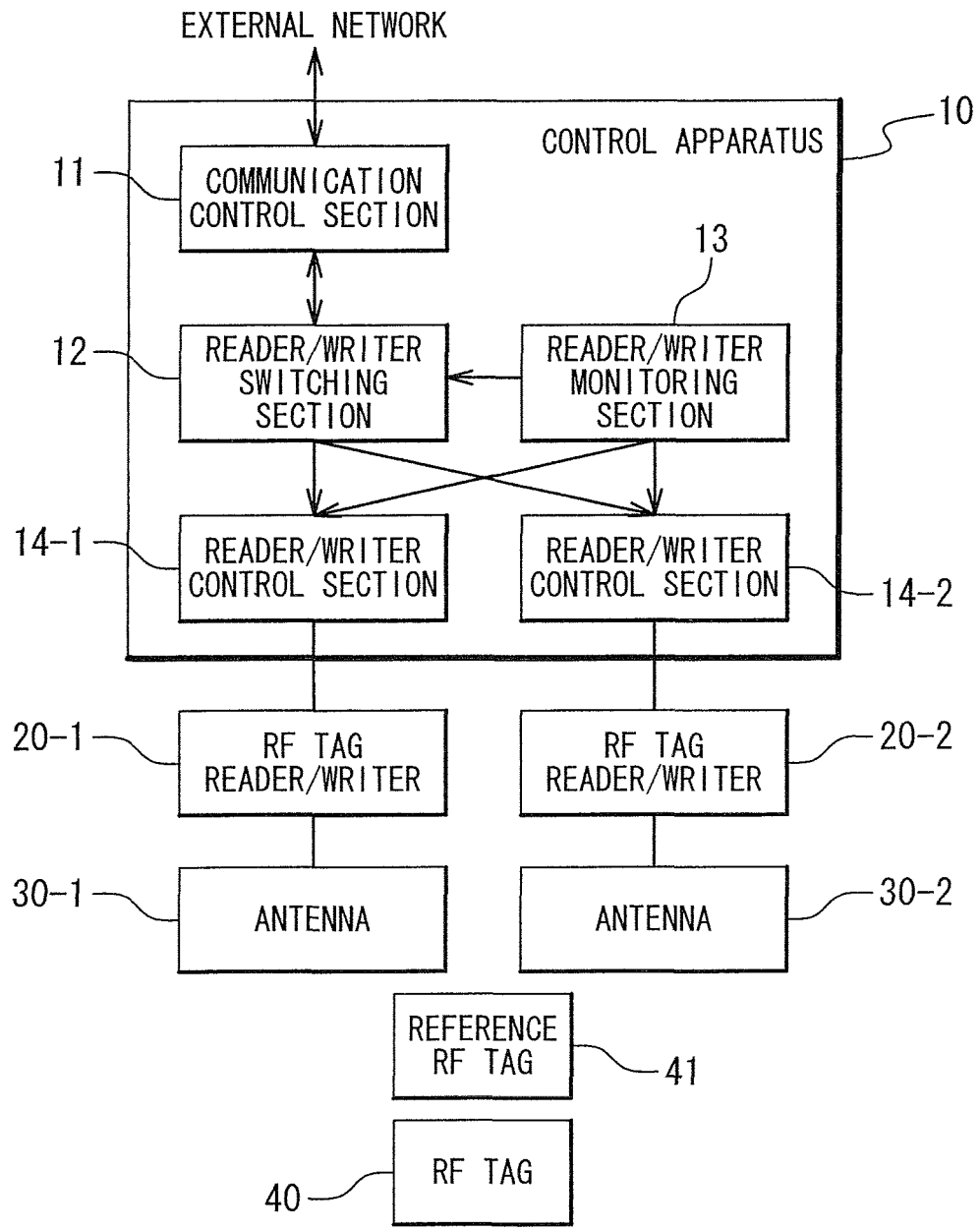
FIG. 3 is a block diagram showing a configuration of a second embodiment of the present invention.

The RF tag system according to the second embodiment of the present invention will be described below in detail with reference to the attached drawings. With reference to FIG. 3, the second embodiment differs from the first embodiment in that there is a reference RF tag 41.

That is, the RF tag system in the second embodiment contains the controller 10, the RF tag reader/writer units 20, the antennas 30, the RF tag 40 and the reference RF tag 41. The controller 10, the RF tag reader/writer units 20, the antennas 30 and the RF tag 40 are similar to those of the first embodiment. The reference RF tag 41 is provided at a position where it can be read from both of the antenna 30-1 and the antenna 30-2. The reference RF tag 41 is provided to check the operations of the antennas 30. The RF tag 40 provided at the position where it can be read from any of the antennas 30 may be used as the reference RF tag 41. Or, a dummy RF tag that stores the meaningless data may be used as the reference RF tag 41.

Figure 4:
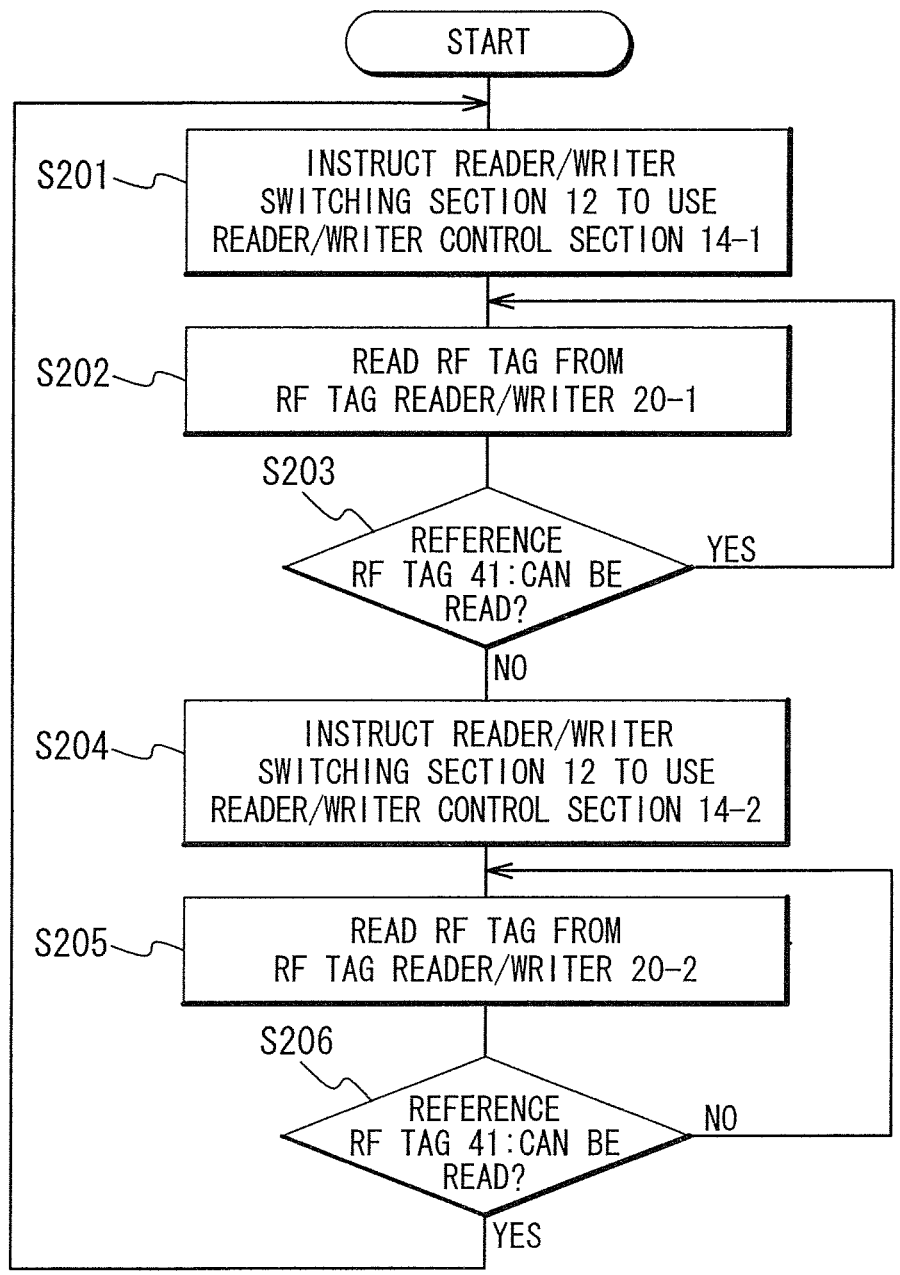
FIG. 4 is a flowchart showing operations of the second embodiment of the present invention.

The process of the reader/writer monitoring section 13 in this embodiment will be described below with reference to FIG. 4. In this embodiment, instead of the check of the trouble of the RF tag reader/writer apparatus, the reading operation of the RF tag 41 is checked.

(1) Step S201

At first, the reader/writer monitoring section 13 instructs the reader/writer switching section 12 to use the reader/writer control section 14-1.

(2) Step S202

Next, the reader/writer control section 14-1 controls the RF tag reader/writer unit 20-1 to read the ID of the reference RF tag 41.

(3) Step S203

If the RF tag reader/writer unit 20-1 can read the ID of the reference RF tag 41, the RF tag reader/writer unit 20-1 and the antenna 30-1 can be considered to be normally operated. Thus, the reader/writer switching section 12 continues to use the reader/writer control section 14-1, and the operational flow returns to the step S202 in its original state.

(4) Step S204

If the RF tag reader/writer unit 20-1 cannot read the ID of the reference RF tag 41, the trouble of the RF tag reader/writer unit 20-1 or antenna 30-1 is considered. Thus, the reader/writer monitoring section 13 instructs the reader/writer switching section 12 to use the reader/writer apparatus control section 14-2.

(5) Step S205

Next, in order to monitor the recovery of the RF tag reader/writer unit 20-1 and the antenna 30-1 from the trouble, the reader/writer control section 14-1 controls the RF tag reader/writer unit 20-1 to read the ID of the reference RF tag 41. This reading operation is periodically performed. Or, this reading operation is performed when the use of the reader/writer control section 14-2 has been completed.

(6) Step S206

If the RF tag reader/writer unit 20-1 cannot read the reference RF tag 41, the operational flow returns to the step S205 in its original state. If the RF tag reader/writer unit 20-1 can read the reference RF tag 41, the RF tag reader/writer unit 20-1 and the antenna 30-1 can be used. Thus, in order to instruct the reader/writer switching section 12 to use the reader/writer control section 14-1, the operational flow returns to the step S201.

Since the data of the reference RF tag 41 is unnecessary for the application, the communication control section 11 removes the ID of the reference RF tag 41. If there is the read request of the data from the reference RF tag 41, this is neglected or treated as the non-existence of the tag. If there is the read request of the RF tag positioned near the antenna, it is reported to the application after the ID of the reference RF tag 41 is removed from the list of the read RF tag ID.

It should be noted that the number of the reference RF tags 41 may be plural. For example, there is a possibility that data cannot be read from the reference RF tag 41 through the RF tag reader/writer unit 20 or the antenna 30 due to the damage or defect of the reference RF tag 41. In this case, even if the reference RF tag 41 as a first candidate is damaged, the check can be performed by reading the reference RF tag 41 as a second candidate. If the reference RF tag 41 as the second candidate can be read, it is judged not to result from the trouble of the RF tag reader/writer unit 20 or antenna 30, and it is judged to result from the defect of the reference RF tag 41 as the first candidate. Consequently, the defect of the RF tag itself can be judged.

As mentioned above, in the present invention, while the plurality of RF tag reader/writer apparatuses provided close to each other are managed and the interferences are avoided, the redundancy of the RF tag reader/writer apparatus is ensured.

What is claimed is:

1. A method of controlling a read operation from an RF tag, comprising:
    issuing a selection instruction to a switching section to select a first RF tag reader/writer control unit;
    reading a data from a reference RF tag by a first RF tag reader/writer unit through said first RF tag reader/writer control unit;
    continuing to select said first RF tag reader/writer control unit by said switching section if the data is successfully read out from said reference RF tag;
    issuing the selection instruction to said switching section to select a second RF tag reader/writer control unit when the data is not successfully read out from said reference RF tag;
    monitoring whether the data is successfully read out from said reference RF tag by said first RF tag reader/writer unit, through said first RF tag reader/writer control unit in order to detect recovery of said first RF tag reader/writer unit from a trouble;
    continuing to monitor said first RF tag reader/writer unit when the data is not successfully read out from said reference RF tag by said first RF tag reader/writer unit; and
    issuing the selection instruction to said switching section to select said first RF tag reader/writer control unit when the data is successfully read out from said reference RF tag.

2. The method according to claim 1, further comprising:
    discarding the data read out from said reference RF tag;
    neglecting a read/write instruction for said reference RF tag; and
    informing to an application, a list of identifiers of RF tags, from which the identifier of said reference RF tag is removed, in response to a read request of the identifiers of the RF tags from said application.

3. A read system for an RF tag, comprising:
    a first RF tag reader/writer unit;
    a second RF tag reader/writer unit;
    a first RF tag reader/writer control unit configured to control said first RF tag reader/writer unit;
    a second RF tag reader/writer control unit configured to control said second RF tag reader/writer unit;
    a switching section configured to select one of said first and second RF tag reader/writer control units in response to a selection instruction; and
    a monitoring section configured to issue the selection instruction to said switching section to select said first RF tag reader/writer control unit, and to monitor whether a data is successfully read out from a reference RF tag by said first RF tag reader/writer unit through said first RF tag reader/writer control unit,
    wherein said switching section continues to select said first RF tag reader/writer control unit when the data is successfully read out from the reference RF tag by said first RF tag reader/writer unit through said first RF tag reader/writer control unit,
    said monitoring section issues the selection instruction to said switching section to select said second RF tag reader/writer control unit when the data is not successfully read out from said reference RF tag by said first RF tag reader/writer unit through said first RF tag reader/writer control unit, monitors whether the data is successfully read out from said reference RF tag by said first RF tag reader/writer unit, through said first RF tag reader/writer control unit in order to detect recovery of said first RF tag reader/writer unit from a trouble, continues to monitor said first RF tag reader/writer unit when the data is not successfully read out from said reference RF tag by said first RF tag reader/writer unit, and issues the selection instruction to said switching section to select said first RF tag reader/writer control unit when the data is successfully read out from said reference RF tag.

4. The read system according to claim 3, further comprising a communication control section configured to discard the data read out from said reference RF tag, neglect a read/write instruction for said reference RF tag, and inform to an application, a list of identifiers of RF tags, from which the identifier of said reference RF tag is removed, in response to a read request of the identifiers of the RF tags from said application.

* * * * *